UNITED STATES PATENT OFFICE.

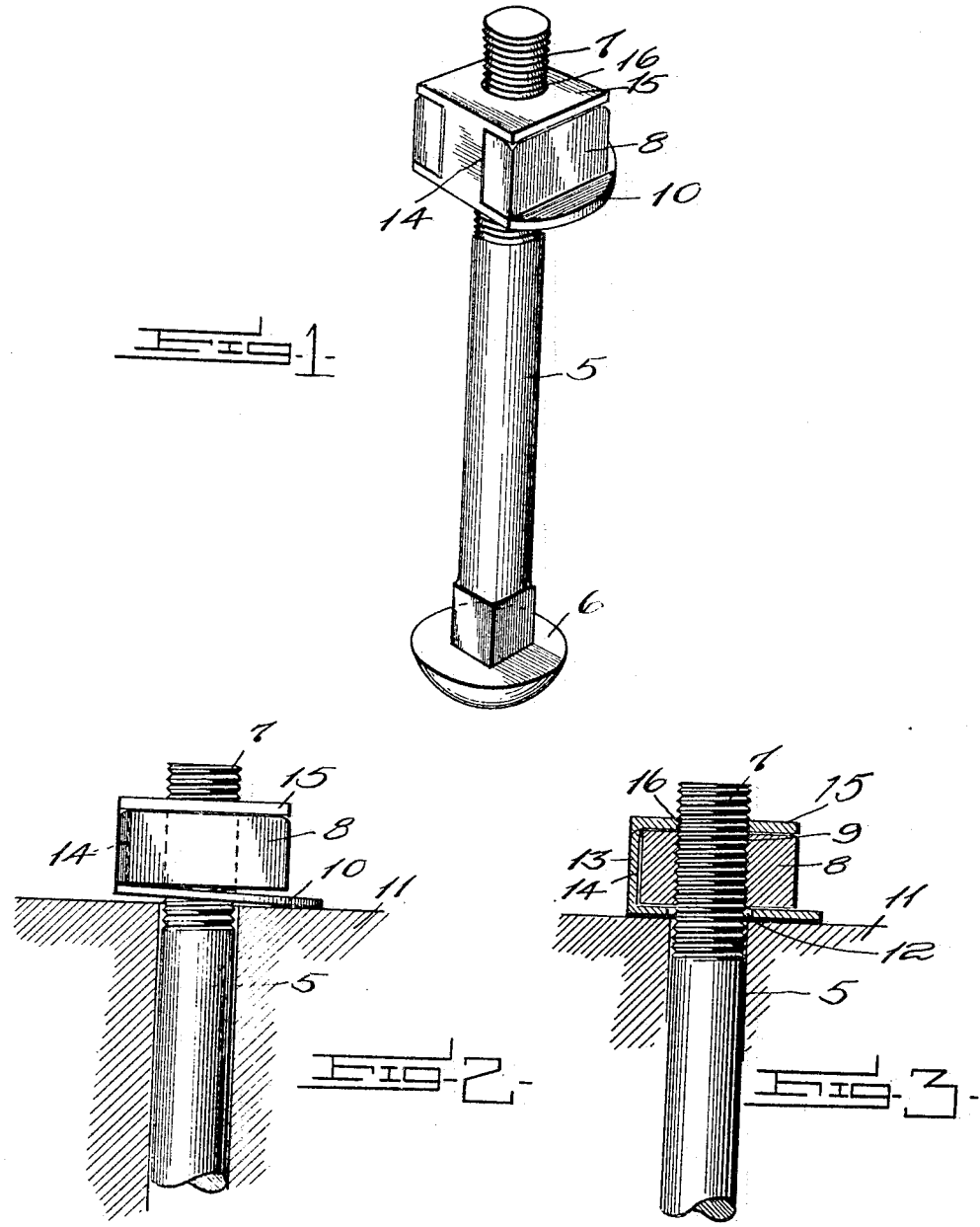

LOUIS J. KLEIN, OF NEWTOWN, MISSOURI.

BOLT AND NUT LOCK.

1,121,258.

Specification of Letters Patent. Patented Dec. 15, 1914.

Application filed August 11, 1914. Serial No. 856,170.

*To all whom it may concern:*

Be it known that I, LOUIS J. KLEIN, a citizen of the United States, residing at Newtown, in the county of Sullivan and State of Missouri, have invented certain new and useful Improvements in Bolt and Nut Locks, of which the following is a specification.

My invention relates to improvements in bolt and nut locks, and has particular reference to apparatus of this character embodying a spring washer surrounding the nut and coupled with the bolt inwardly of the nut and coupled with the nut to be held in an inclined position with relation thereto, whereby the same will yieldingly engage with the work, thus holding the nut against accidental rotation, but allowing the same to be unscrewed by the proper means, when desired.

An important object of the invention is to provide means of the above mentioned character, which are simple in construction, inexpensive to manufacture, convenient in use, strong and durable.

Other objects and advantages of the invention will be apparent during the course of the following description.

In the accompanying drawings forming a part of this specification and in which like numerals are employed to designate like parts throughout the same, Figure 1 is a perspective view of a nut and bolt lock embodying my invention, Fig. 2 is a fragmentary side elevation of the same, placed in operation, and, Fig. 3 is a similar view, parts being shown in section, the nut being screwed up to place the spring washer under tension.

In the drawings, wherein for the purpose of illustration is shown a preferred embodiment of my invention, the numeral 5 designates a bolt of any well known or preferred type. This bolt is provided with the usual head 6 and opposite screw-threaded portion 7. Having screw-threaded engagement with the portion 7 is a nut 8, which may be square in cross-section, polygonal or other than round. This nut, as more clearly shown in Fig. 3, is provided with the usual axial screw-threaded opening 9.

The numeral 10 designates a spring washer, which is interposed between the nut 8 and the work 11, as more clearly shown in Figs. 2 and 3. This spring washer is provided approximately centrally thereof with a relatively large opening 12, receiving the screw-threaded portion 7, but having no screw-threaded engagement therewith, the opening 12 having a substantially greater diameter than the screw-threaded portion 7, whereby the spring washer 10 may be laterally swung with relation to the screw-threaded portion. Connected with one end of the spring washer 10 and formed integral therewith is a connecting strip 13, adapted to enter a groove 14 formed upon one side of the nut 8. The spring washer 10 is arranged at an angle or is horizontally inclined with respect to the strip 13, before being placed under tension, as clearly shown in Fig. 2. Connected and preferably formed integral with the upper end of the strip 13 is a cap 15, permanently arranged at substantially a right angle thereto, as shown. The cap 15 is provided with a screw-threaded opening 16, in registration with the screw-threaded opening 9, to receive the screw-threaded portion 7 of the bolt. In the manufacture of the spring washer, all parts thereof, to wit, elements 10, 13, and 15, may be advantageously stamped from a section of suitably stiff spring sheet metal, the parts being subsequently bent upon the opposite ends of the strips 13, to assume the desired position.

In the use of the apparatus, the spring washer 10, strip 13, and cap 15 are arranged upon the nut, the groove 14 receiving the strip 13, thereby serving to retain these parts together. The nut 8 may be secured upon the bolt in the usual manner, the screw-threaded portion 7 passing through the opening 16 in the cap 15, whereby this cap is positively locked in engagement with the top of the nut 8 and retained parallel thereto. As a result of this the spring washer 10 is normally retained at an angle to the nut 8, the same being inclined downwardly away from the same, as best illustrated in Fig. 2. Upon further screwing up the nut, it is obvious that the spring washer 10 will be compressed until it lies flat or parallel with the nut, the same however exerting a continuous yielding pressure upon the work 11, thereby holding the nut against accidental rotation, but allowing the same to be unscrewed by suitable means.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having thus described my invention, I claim:—

1. The combination with a bolt and nut, of a spring washer having an opening to receive the bolt and arranged inwardly of and adjacent the nut, a strip carried by the washer and adapted to engage one side of the nut with the spring washer normally disposed at an angle greater than a right angle with relation to the strip, and a cap carried by the opposite end of the strip to be arranged upon the top of the nut and provided with a screw-threaded opening to receive and engage the screw-threaded portion of the bolt whereby the cap is held against the top of the nut in parallel relation thereto.

2. The combination with a bolt and nut, of connected spaced cap and spring washer to be arranged upon the opposite ends of the nut respectively, the spring washer being normally disposed at an angle with relation to the cap and the cap being provided with a screw-threaded opening to receive and engage the screw-threaded portion of the bolt.

3. The combination with a bolt and nut provided upon one side with a groove, of a cap to be arranged upon the top of the nut and having a screw-threaded opening to receive and engage the screw-threaded portion of the bolt, a transverse strip carried by the cap and arranged at substantially a right angle with relation thereto, and a spring washer having an opening receiving the bolt of substantially greater diameter than the bolt and carried by the strip and normally disposed at an angle with relation to the cap.

In testimony whereof I affix my signature in presence of two witnesses.

LOUIS J. KLEIN.

Witnesses:
E. S. PIGG,
LOGAN SHUEY.

Copies of this patent may be obtained for five cents each, by addressing the "Commissioner of Patents, Washington, D. C."